(12) United States Patent
Schwaiger et al.

(10) Patent No.: US 9,933,134 B2
(45) Date of Patent: Apr. 3, 2018

(54) LIGHTING DEVICE WITH PHOSPHOR SURFACE

(71) Applicant: OSRAM GmbH, Munich (DE)

(72) Inventors: Stephan Schwaiger, Ulm (DE); Oliver Hering, Niederstotzingen (DE); Juergen Hager, Herbrechtingen (DE)

(73) Assignee: OSRAM GmbH, Munich (DE)

( * ) Notice: Subject to any disclaimer, the term of this patent is extended or adjusted under 35 U.S.C. 154(b) by 457 days.

(21) Appl. No.: 14/554,071

(22) Filed: Nov. 26, 2014

(65) Prior Publication Data

US 2015/0176809 A1 Jun. 25, 2015

(30) Foreign Application Priority Data

Dec. 19, 2013 (DE) .................. 10 2013 226 622

(51) Int. Cl.
*F21V 9/16* (2006.01)
*F21V 13/08* (2006.01)
*F21S 8/10* (2006.01)
*G02B 26/10* (2006.01)
*F21K 9/64* (2016.01)
*F21V 14/04* (2006.01)
*F21Y 115/30* (2016.01)
*F21Y 115/10* (2016.01)
*F21Y 113/13* (2016.01)

(52) U.S. Cl.
CPC .............. *F21V 13/08* (2013.01); *F21K 9/64* (2016.08); *F21S 48/1145* (2013.01); *F21S 48/1225* (2013.01); *F21S 48/1747* (2013.01); *F21S 48/1757* (2013.01); *G02B 26/105* (2013.01); *F21V 14/04* (2013.01); *F21Y 2113/13* (2016.08); *F21Y 2115/10* (2016.08); *F21Y 2115/30* (2016.08)

(58) Field of Classification Search
CPC ............ F21S 48/1145; F21V 9/08; F21V 9/16
See application file for complete search history.

(56) References Cited

U.S. PATENT DOCUMENTS

2005/0110954 A1 5/2005 Kojima
2006/0044297 A1 3/2006 Furukawa et al.
(Continued)

FOREIGN PATENT DOCUMENTS

DE 102007025330 A1 12/2008
DE 102010028949 A1 11/2011
(Continued)

OTHER PUBLICATIONS

Search Report issued for parallel German patent application No. 102013226622.7 dated Oct. 1, 2014.

*Primary Examiner* — Evan Dzierzynski
(74) *Attorney, Agent, or Firm* — Viering, Jentschura & Partner mbB (57) ABSTRACT

A lighting device may include a light generating unit configured to generate at least two light beams; at least one phosphor surface which is illuminatable by the light beams; and at least one movable deflection mirror for the scanning deflection of the light beams onto the phosphor surface, such that the light beams impinge on the at least one phosphor surface in a spaced-apart fashion, and such that at least one region of the phosphor surface is illuminatable by at least two light beams in a manner spaced apart temporally.

11 Claims, 3 Drawing Sheets

(56) References Cited

U.S. PATENT DOCUMENTS

| | | |
|---|---|---|
| 2009/0046474 A1 | 2/2009 | Sato et al. |
| 2013/0058114 A1 | 3/2013 | Reiners |
| 2013/0242268 A1* | 9/2013 | Saitou ................ G03B 21/2013 353/31 |
| 2014/0029282 A1* | 1/2014 | Ravier .................... F21S 48/17 362/510 |
| 2015/0029740 A1* | 1/2015 | Na ....................... F21S 48/1154 362/521 |

FOREIGN PATENT DOCUMENTS

| | | |
|---|---|---|
| DE | 102012100141 A1 | 7/2013 |
| DE | 102012208566 A1 | 11/2013 |
| EP | 1351522 A2 | 10/2003 |
| WO | 2013174683 A1 | 11/2013 |
| WO | 2014121314 A1 | 8/2014 |
| WO | 2014121315 A1 | 8/2014 |

* cited by examiner

LIGHTING DEVICE WITH PHOSPHOR SURFACE

CROSS-REFERENCE TO RELATED APPLICATION

This application claims priority to German Patent Application Serial No. 10 2013 226 622.7, which was filed Dec. 19, 2013, and is incorporated herein by reference in its entirety.

TECHNICAL FIELD

Various embodiments relate generally to a lighting device, including a light generating unit configured to generate a light beam, a phosphor surface which is illuminatable by the light beam, and at least one movable deflection mirror for the scanning deflection of the light beam onto the phosphor surface. Various embodiments are applicable e.g. to vehicle luminaires, e.g. to vehicle headlights, e.g. of automobiles.

BACKGROUND

For generating temporally varying light emission patterns, especially without large moving parts, there is the possibility of writing corresponding light distributions by means of a laser to a conversion colorant spaced apart therefrom ("remote phosphor"). The light distribution that arises there can be imaged into a far field by means of traditional imaging systems and can generate the desired light emission pattern there. Particularly in the case of exterior lighting, e.g. by headlights, the momentary (peak) loading of the conversion colorant on account of the high power density required for sufficiently intense illumination can become very high, however. In the case of high required luminous fluxes, the loading may even become too high to be able to be realized at all. Especially if high resolutions (i.e. small spatial pixels) are intended to be realized, the momentary peak power densities on the conversion colorant become very great.

DE 10 2007 025 330 A1 discloses a projection device including at least two light sources for emitting respective light beams and a projection unit for deflecting the light beams onto a projection surface, wherein at least two of the light sources are aligned such that they emit the light beams at a predefined angle with respect to one another. A further projection device includes at least two light sources for collinearly emitting respective light beams, a deflection system for non-collinearly deflecting the light beams and a projection unit for deflecting the non-collinear light beams onto a projection surface, wherein the deflection system has at least one common micro-optical element.

EP 1 351 522 A2 discloses a scanning optical display system which has a small number of parts and is easily miniaturized. The system includes a multiplicity of light sources which emit light having mutually different wavelength ranges, a light combining element for combining the multiplicity of light beams emitted by the light sources, and an optical scanning system which applies the combined light to a scan surface in a scanning fashion. The light combining element is an optical diffraction element.

US 2005/0110954 A1 discloses a light projector including a projection means for projecting an image onto a screen for image representation by the scanning of laser light. The laser light contains a multiplicity of laser beams. The projection unit irradiates a substantially identical position on the screen with the multiplicity of laser beams with a time difference. An image signal assigned to each of the laser beams has a time difference, such that a preceding laser beam is delayed relative to a succeeding laser beam in order to correspond to the time shift in the irradiation.

US 2006/0044297 A1 discloses an image display device including a light source having a multiplicity of light emitters and an optical projection system, whereby light from the light source is radiated in a scanning fashion in a main scanning direction and in a subsidiary scanning direction in order to generate an image with a predefined number of pixels on a screen. The scan lines in the main scanning direction are formed by the light emitted by each of the light emitters and are controlled such that they are imaged in a manner superimposed on one another on the screen.

SUMMARY

A lighting device may include a light generating unit configured to generate at least two light beams; at least one phosphor surface which is illuminatable by the light beams; and at least one movable deflection mirror for the scanning deflection of the light beams onto the phosphor surface, such that the light beams impinge on the at least one phosphor surface in a spaced-apart fashion, and such that at least one region of the phosphor surface is illuminatable by at least two light beams in a manner spaced apart temporally.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments may at least partly overcome the disadvantages of the prior art and may provide an improved possibility for generating temporally varying light distributions by a remote phosphor arrangement. Various embodiments provide temporally varying light distributions of high brightness by a simple and inexpensive remote phosphor arrangement.

Various embodiments provide a lighting device, including a light generating unit configured to generate at least two (excitation) light beams, at least one phosphor surface which is illuminatable by the light beams, and at least one deflection unit configured to scan deflection of the light beams onto the phosphor surface, such that the light beams impinge on the at least one phosphor surface in a spaced-apart fashion and such that at least one region of the phosphor surface is illuminatable successively by at least two light beams impinging in a spaced-apart fashion. This takes place e.g. during a set-up of an image or within an image set-up time. The time spacing between two light beams impinging in a spaced-apart fashion is therefore e.g. within the chosen image set-up time.

This lighting device may have the effect that both the power density of the actual light source and the momentary peak power density in the phosphor surface can be reduced. Each region which is illuminatable in a manner spaced apart temporally on the phosphor surface or in the far field (the correlation between phosphor surface and far field is established by an optical imaging system, for example) can then be swept over by a plurality of light sources or each light source and therefore need only be subjected to a lower intensity in order to generate the same luminous flux within a predefined integration time corresponding to the predefined image set-up time. The luminous flux is composed e.g. multiplicatively of an intensity of the incident light and the associated irradiation time, that is to say that luminous flux=intensity*irradiation time holds true. The total irradiation time of the region rises as a sum over the more than one light beam. Therefore, instead of duplicating an arrangement operating with a single light beam and superimposing the light emission patterns thereof in the far field and in this case reducing the power of the individual arrangements, here at least the excitation light beam is multiplied.

By virtue of the fact that the light generating unit is arranged remote from the phosphor surface and the light beams generated by it pass through an air clearance as far as the phosphor surface, the lighting device may also be designated as a "remote phosphor" lighting device.

The fact that the light beams impinge on the at least one phosphor surface in a spaced-apart fashion means, for example, that at least two light beams do not impinge on the phosphor surface congruently at the same time, i.e. do not irradiate exactly the same focal spot at the same time. Instead, by way of example, at least two light beams may impinge on the at least one phosphor surface simultaneously without local overlapping or with only partial local overlapping of their extended focal spots, or form non-overlapping or only partly overlapping focal spots on said phosphor surface.

An image set-up time is understood to mean e.g. that time duration which is required to set up an individual image of an image sequence reproduced with a specific image refresh frequency or image refresh rate. An image set-up time may e.g. also be understood to mean the time duration which is required to illuminate the phosphor surface. It may be provided for the irradiation times of regions of the phosphor surface to be adapted both to a desired image refresh frequency for traversing a track on the phosphor surface or "repetition rate" and to a relaxation time of the phosphor. It may also be provided for the image refresh frequency to be at least 25 Hz, such that successive light emission patterns are perceived as succeeding one another continuously. Said image refresh frequency of 25 Hz, ideally even of at least 100 Hz or even of at least 200 Hz, given a resolution chosen by way of example between 0.05° and 1° in the far field (and thus a number of approximately 800 to 320 000 pixel-like regions or pixels on the phosphor surface), leads to average irradiation times of such a pixel of between 50 microseconds [800 pixels/25 Hz] and just 15 nanoseconds [320 000 pixels/200 Hz]. In this irradiation time, the phosphor should be able both to convert the desired quantity of light and at least partly to relax, such that a further, at least partial excitation can take place. In various embodiments, the parameters of the lighting device (e.g. the number of pixels [and thus a resolution and a range] and the image refresh rate) are chosen such that conventional conversion colorants can realize them. If there is a desire not to illuminate all pixels uniformly, but rather also additionally to vary them over time, then it may be provided for the average irradiation duration (averaged over all pixels) to be in the range of microseconds.

The deflection unit may include one or a plurality of movable deflection mirrors. At least one movable deflection mirror may be embodied e.g. for the scanning or line-like deflection of the incident excitation or primary light beam. At least one movable deflection mirror may be embodied for the scanning deflection of the incident excitation or primary light beam in one direction or in two (e.g. mutually perpendicular) directions. For the scanning deflection, the deflection mirror may be embodied as pivotable e.g. about at least one rotation axis.

The lighting device may be e.g. a lighting module or a "light engine".

The light generating unit may include one or a plurality of light sources. The light generated by at least one light source may be split into two or more different light beams, e.g. by a beam splitter. The light from a plurality of light sources may be combined or united into one light beam.

In various embodiments, at least two light beams have different light paths and therefore do not lie congruently on one another at least directly before impinging on the phosphor surface.

The phosphor surface may include at least one phosphor or conversion colorant which converts the primary light of the light beams incident thereon at least partly into secondary light having a different wavelength, e.g. a longer wavelength. This wavelength conversion is known in principle, and need not be explained any further here. By way of example, a phosphor may convert incident blue primary light partly into yellow secondary light, such that overall blue-yellow or white mixed light having corresponding proportions of primary light and secondary light is emitted by the phosphor surface.

In one development, at least two light beams comprise (primary) light having an identical wavelength or an identical spectral distribution. In other words, these at least two light beams have the same color, and consist e.g. of blue light. However, the light generating unit may additionally generate light beams of a different color with respect thereto.

In one development, moreover, all light beams incident on a specific phosphor surface are of an identical wavelength or color.

In one development, furthermore, the phosphor surface includes exactly one phosphor, which may particularly simplify its production and a construction of the lighting device.

It may be provided for this purpose, for example, for all light beams incident on said phosphor surface to be of an identical wavelength or color.

In another development, the phosphor surface includes a plurality of phosphors which generate different secondary light (i.e. secondary light in a different spectral range or of a different color). At least two phosphors may be excited by an identical light beam (i.e. by light of an identical color) for generating different secondary light. Proportions of the different secondary light can be established for example by a corresponding proportion of the phosphors.

It is also possible to selectively excite at least two phosphors in an identical region of the phosphor surface (e.g. at a pixel thereof) by means of light beams of different colors. The region may be swept over successively for example by at least two light beams of a first color for exciting a first phosphor and by at least one light beam of a second color for exciting a second phosphor. By way of example, a single light beam of the second color may suffice if a proportion of an associated secondary light in the resulting mixed light of the lighting device is only small.

In one configuration, moreover, the at least one movable deflection mirror includes at least one MEMS ("Micro Electro Mechanical System") mirror or similarly acting optical mirror systems. An MEMS mirror also enables accurate step-by-step or stepwise, e.g. also practically continuous, pivoting. In addition, an MEMS mirror enables particularly precise and delay-free pivoting forward and backward, as a result of which it is possible to reduce dead times during the illumination of the phosphor surface. Furthermore, an MEMS mirror pivotable in two directions, in particular, affords a simple possibility for illuminating the entire phosphor surface with little delay, since it enables a line advance (e.g. in the case of line-like illumination without further deflection elements).

However, the movable deflection mirror may e.g. also be a mirror driven by electric motor.

At least one pivotable mirror need not be a mirror oscillating to and fro, but rather may e.g. also be embodied as a circumferentially rotating mirror. This facilitates control of the rotational movement in particular in the case of a mirror driven by electric motor.

By virtue of the line-like scanning or illumination of the phosphor surface, it is possible to implement e.g. a so-called "flying spot" method.

For the scanning deflection of the light beams onto the phosphor surface, the at least one deflection mirror is designed and arranged, for example, to guide the light beams on a predetermined track over the phosphor surface. Said track may correspond e.g. to a line-like track guidance. By a light beam being switched on and off in a targeted fashion, the track may be illuminated by said light beam only in sections. A light beam may be switched on and off e.g. in a bit-like fashion or in a manner similar to a bit pattern.

In various embodiments, the phosphor surface may be illuminated such that a matrix-like illumination pattern constructed from pixels is generated on it. The form in which a light beam is switched on and off is also designated as illumination sequence. Different illumination sequences may differ e.g. in terms of different and/or staggered switch-on and/or switch-off times, e.g. by virtue of a different sequence of switch-on phases, in the case of clocked operation of a light source e.g. by virtue of a different sequence of turn-on pulses. In one configuration, therefore, the light beams can be switched on and off individually.

For switching the light beam on and off, the at least one light source which generates the light beam may be operated in a clocked fashion. Alternatively or additionally, e.g. a controllable diaphragm may be arranged in a path of the light beam, and the at least one light source may be driven e.g. in continuous operation.

The fact that at least one region of the phosphor surface—e.g. at least one "pixel"—is illuminatable by at least two light beams in a manner spaced apart temporally comprises, for example, the fact that said at least one region is illuminated successively by at least two light beams and, consequently, is illuminated at least twice. However, not every region, e.g. pixel, of the phosphor surface need be illuminated multiply by spaced-part light beams. In various embodiments, there may also be at least one region, e.g. pixel, which is illuminated only by one light beam within the image set-up time (generally: is illuminated by a number of light beams that is less than the maximum possible number of light beams).

In one development, at least two light beams or light paths have or traverse the same track at least in sections. This encompasses the fact, for example, that the tracks of these two light paths do not intersect only at points. In one specific development, at least two light beams or light paths have or traverse exactly the same track on the phosphor surface. Their illumination sequences can differ in this case. The illumination sequences may be staggered temporally in particular at least in sections e.g. for the purpose of traversing the same track on the phosphor surface. Outside the phosphor surface, the at least two light beams need not traverse the same track, but can do so.

In one configuration, a plurality of light sources, e.g. lasers, for generating respective light beams are present. In various embodiments, the at least one light source includes at least one semiconductor light source. By way of example, the at least one semiconductor light source may include at least one diode laser.

However, the laser may also be a general laser, which therefore need not be semiconductor-based. If a laser is used, the arrangement may also be referred to as an LARP ("Laser Activated Remote Phosphor") arrangement. However, the light source may also include at least one semiconductor light source in the form of a light emitting diode.

In one configuration, at least two light beams generate focal spots with a predetermined spacing on the phosphor surface, e.g. on an identical track or with an identical track spacing. This may have the effect that a light emission of the regions swept over by both light beams has a defined characteristic, e.g. an identical intensity integrated over time.

Generally, two or more focal spots can differ in a targeted manner in terms of their shape, in terms of a size of their area, in terms of their intensity or in terms of their intensity profile, etc., for example by virtue of the use of different light sources and/or different light paths (e.g. with different optical elements).

It is also possible for two or even more (extended) focal spots to be partly superimposed. This positioning between full separation and full superimposition makes it possible, in a simple manner, for example, to generate a linearly extended focal spot (a "line") from a light beam being switched on and off in a clock-like manner or else to generate other more complex larger shapes within a pixel-like matrix or the like.

In one development, in the region of overlap or superimposition region, a combined intensity of the light of both light beams is not higher than a peak intensity of an individual beam. In various embodiments, an intensity of a light beam in the superimposition region in the case of two identical light beams may have not more than 50% of the peak intensity of one of the individual beams. The peak intensity of spaced-apart light beams may be identical or different.

In another configuration, the lighting device is designed to vary a distance between the focal spots on the phosphor surface. As a result, a characteristic of the regions swept over by both light beams can change in a targeted manner.

In one configuration which may be provided for changing the spacing of the focal spots, the lighting device is designed to vary a setting angle of at least one of the light beams relative to an associated deflection mirror. This may be achieved for example by a change of a primary optical unit disposed directly downstream of the at least one light source, or by a change of an alignment and/or a position of at least one of the light sources. By way of example, at least one light source, e.g. at least one laser, may be rotated and/or shifted by means of at least one actuator (e.g. piezoactuator) and/or motor.

In another configuration which may be provided for changing the spacing of the focal spots, the lighting device is designed to direct at least two light beams onto respective movable deflection mirrors and is designed to vary an alignment of said deflection mirrors with respect to one another. In other words, a dedicated deflection mirror is assigned to each of the at least two light beams under consideration. A further, common deflection mirror may be disposed optically downstream of these deflection mirrors. The deflection mirrors may have e.g. a common rotation axis. A spacing of the two light beams on the phosphor surface can then be achieved e.g. by a different rotation angle in relation to the rotation axis. A change of the spacing of two focal spots can thus be achieved in a simple manner for example by a variation of an angular difference of the associated deflection mirrors with respect to one another. These deflection mirrors may be MEMS mirrors.

If two deflection mirrors are disposed one optically downstream of another, e.g. as described above, they may deflect a light beam e.g. in mutually perpendicular directions. By way of example, one of the mirrors may bring about a deflection in a horizontal direction and the other mirror a deflection in a vertical direction. In this regard, by way of example, it is possible to dynamically change the spacing between the focal spots in a "focal spot matrix" at least in one spatial direction (horizontally or vertically). In this regard, it is possible, for example, to omit an inner region of the light distribution (e.g. with horizontal angles that are small in terms of absolute value), while the outer regions are illuminated.

In one configuration, furthermore, the light beams are angled with respect to one another. It is thereby possible to achieve, in a simple manner, a predetermined spacing of the focal spots in conjunction with a jointly used optical system for the light beams.

In one development, the lighting device comprises a plurality of sets of elements as described above, e.g. in order to generate respective partial regions of a light distribution pattern. This may increase a brightness or a luminous flux of the light emission pattern.

In another development, it may be the case that the lighting device includes a plurality of sets of elements as described above which generate secondary light of different colors and/or different proportions. In this regard, a color of light of the light emission pattern can be established particularly diversely.

The lighting device is applicable e.g. for illumination of surroundings. The lighting device may be e.g. a lighting device, e.g. a headlight, e.g. of a vehicle. The vehicle may be for example a land-bound motor vehicle, but e.g. also an airplane, a helicopter or a ship. The land-bound motor vehicle may be e.g. an automobile or a truck.

Various embodiments provide a method for generating a light emission pattern, wherein the method includes at least the following: illuminating at least one phosphor surface by at least two light beams such that at least one region of the phosphor surface (e.g. a track or a section of a track) is illuminated by at least two light beams in a manner spaced apart temporally or successively. The method can be embodied analogously to the device and achieves the same effects.

Figure 1:
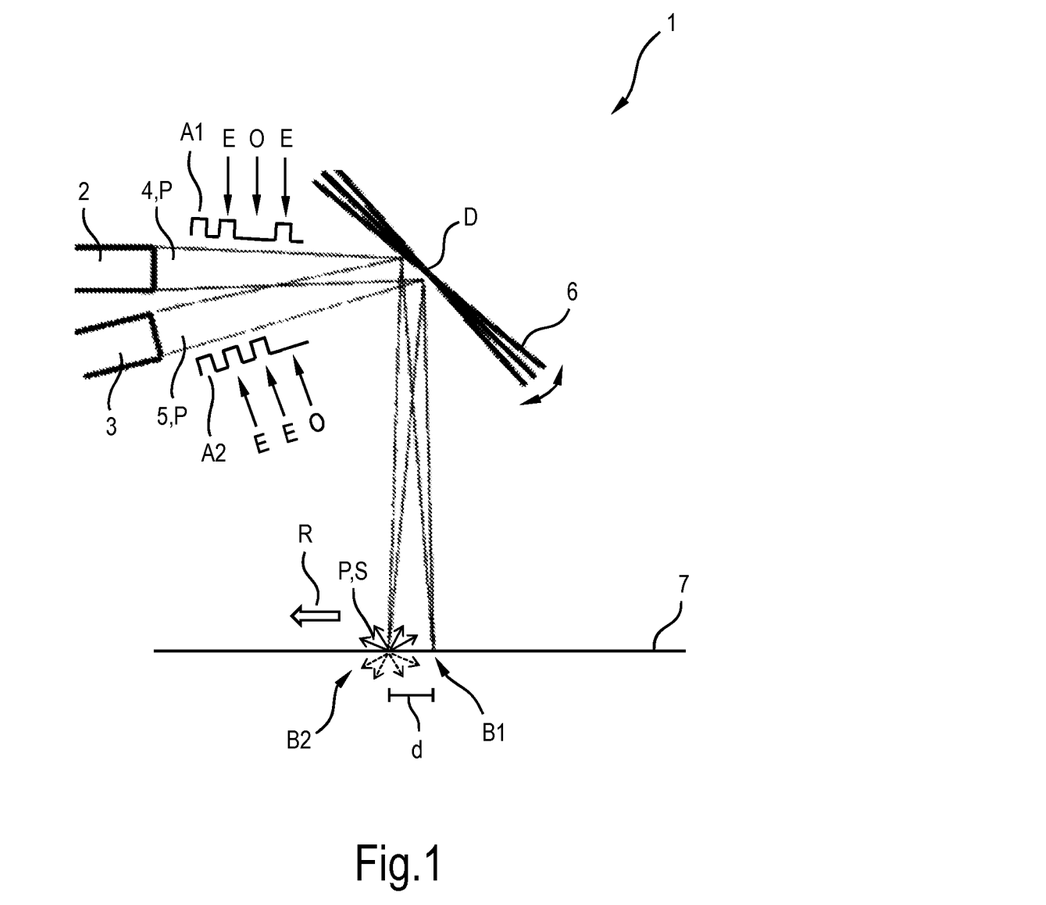
FIG. 1 shows, in a plan view from above, a simplified schematic diagram of one possible basic construction of a lighting device.

FIG. 1 shows a lighting device in the form of a lighting module 1. The lighting module includes a light generating unit having two lasers 2 and 3, which emit light beams (laser beams) 4 and 5, respectively, onto a deflection mirror 6. The deflection mirror 6 has a rotation axis D oriented vertically here. The deflection mirror 6 is shown in three possible rotational positions, but is pivotable forward and backward in principle freely between two end positions. The deflection mirror 6 deflects the light beams 4, 5 onto a phosphor surface 7 covered with a phosphor layer. The light beams 4, 5 impinge on the deflection mirror 6 here with an identical spacing with respect to the rotation axis D, e.g. in a manner centered with respect to the rotation axis D.

The lasers 2 and 3 emit light beams 4, 5 including primary light P of an identical color, e.g. with blue color. The lasers 2 and 3 may be constructed identically. The lasers 2 and 3 are individually drivable, namely in a clocked fashion here purely by way of example. As a result, the light beams 4, 5 also correspond to a temporally clocked sequence A1 and A2, respectively, of on states (light intensity>0 or light on) E and off states (light intensity=0 or light off) O, e.g. in a manner similar to a bit pattern.

The light beams 4, 5 are deflected onto the phosphor surface 7 in a line-like scanning manner, e.g. in a manner similar to a flying spot method. This may be implemented for example by the deflection mirror 6 being pivoted to and fro between the two end positions in such a way that the light beams 4, 5 sweep over the phosphor surface 7 on a track having a plurality of lines. This is indicated here by a movement direction R. By virtue of the fact that the lasers 2 and 3 and thus also the light beams 4, 5 are aligned in an angled manner with respect to one another, the light beams 4, 5 impinge on the phosphor surface 7 in a spaced-apart fashion at a specific point in time. In this case, the light beams 4, 5 can generate a corresponding illumination sequence on the phosphor surface 7 depending on their on and off states E and O there. For a line advance, that is to say a change of line, the deflection mirror 6 may be pivoted for example step by step about a further rotation axis (not illustrated) lying in the plane of the drawing. The deflection mirror 6 may be embodied as an MEMS mirror for this purpose.

Where the light beams 4, 5 impinge on the phosphor surface 7, the blue primary light P is converted at least partly into secondary light S having a longer wavelength, e.g. into yellow light. A corresponding focal spot B1 and B2 on the phosphor surface 7 thus emits mixed light P, S having proportions of primary light P and secondary light S, e.g. blue-yellow or white mixed light P, S.

Depending on the embodiment of the lighting module 1, the mixed light P, S reflected from the phosphor surface 7 may be used as useful light for generating a light emission pattern in the far field, as indicated by the continuous arrows at the focal spot B2 ("reflection arrangement"). Alternatively or additionally, the mixed light P, S emerging at that side of the phosphor surface 7 which faces away from the incident light beams 4, 5 may be used as useful light for generating a light emission pattern in the far field, as indicated by the dotted arrows at the focal spot B2 ("transmitted-light arrangement").

As a result of the identical spacing of the light beams 4, 5 with respect to the rotation axis D, they impinge on the phosphor surface 7 with predetermined spacing d or their focal spots B1 and B2, respectively, have this predetermined spacing d from center to center. The spacing d can be changed for example by changing a setting angle of at least one of the lasers 2 and/or 3 with respect to the deflection mirror 6 or by changing the angle formed by the beam direction of the light beams 4, 5. For this purpose, at least one of the lasers 2, 3 may be moved, e.g. rotated, by motor, e.g. by means of an actuator or electric motor (not illustrated).

Figure 2:
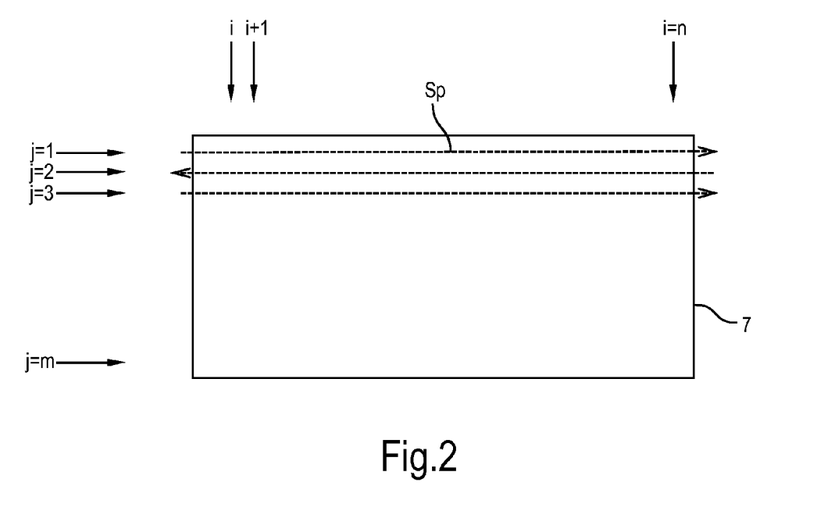
FIG. 2 shows a phosphor surface of the lighting device in a frontal view.

FIG. 2 shows the phosphor surface 7 in a frontal view with a track Sp of the light beams 4, 5 on the phosphor surface 7. The track Sp is composed of m horizontally running lines j, which are indicated by the dashed arrows and which are traversed by the light beams 4 and 5 in the event of the deflection mirror 6 pivoting about the rotation axis D. Each of the lines j has a maximum of i=n pixels. In various embodiments, in the case of continuous pivoting of the mirror 6, the resolution is likewise continuous, such that no "genuine" or optically individually resolvable pixels exist. As a result, an (m×n)-shaped focal spot pattern or illumination pattern can be generated on the phosphor surface 7. In this case, the focal spots B1, B2 correspond to pixels of a light emission pattern projected into the far field. The track Sp of the light beams 4 and 5 may extend beyond the phosphor surface 7.

It may be provided for an image refresh frequency (e.g. the number of illumination cycles on the phosphor surface 7 per second) to be at least 100 Hz, such that the generation of the individual pixels can no longer be resolved temporally by a human eye even at a relatively large distance. An image set-up time may be not more than 10 milliseconds. It may be provided for the image refresh frequency to be at least 200 Hz, such that an image set-up time is not more than 5 milliseconds. In this time, excitation light can be applied to the regions of the phosphor surface not at all, once, or a plurality of times.

Figure 3:
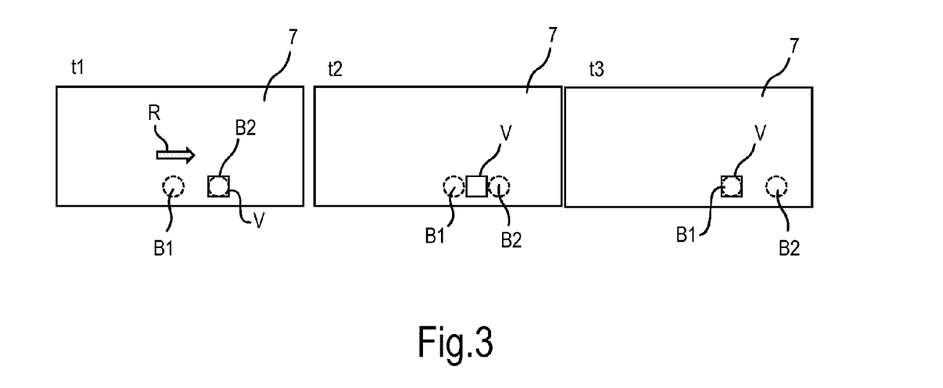
FIG. 3 shows a movement of two focal spots over the phosphor surface.

FIG. 3 shows a movement of two focal spots B1, B2 over the phosphor surface 7 with the aid of three images staggered over time.

The phosphor surface 7 is shown at a first instant t1 in the left partial image. A stationary region V on the phosphor surface 7, which region corresponds to a pixel (i;j) of the (m×n) matrix of all the pixels, is illuminated here first by a light beam 5. The associated focal spot B2 is thus generated at this region V. The region V therefore emits white light, for example.

At a later instant t2>t1, as shown in the middle partial image, the stationary region V is no longer illuminated. The phosphor present there can relax.

At an even later instant t3>t2, as shown in the right partial image, the stationary region V is illuminated again, although now by the light beam 4 then traversing the track Sp. Consequently, the stationary region V is luminous again. The stationary region V is thus illuminated by the two light beams 4 and 5 in a manner spaced apart temporally. A temporal spacing of the light beams 4 and 5 on the phosphor surface 7 is typically so small that multiple illumination of the stationary region V during traversal of the entire track Sp or during an image set-up time is no longer resolved temporally by a human observer, but rather is integrated. The momentary intensity of the light beams 4 and 5 in the region V and the power densities of the light sources 2 and 3 can thus be halved in comparison with use of an individual light beam, to be precise in conjunction with intensities and luminous fluxes that are the same overall (on average over time).

Figure 4:
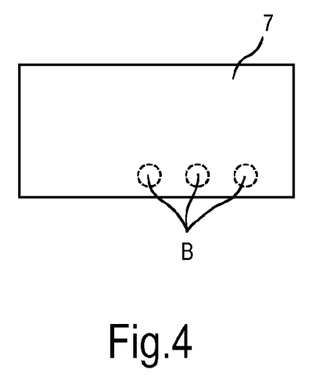
FIGS. 4 to 7 show other arrangements of possible focal spots on the phosphor surface.
Figure 5:
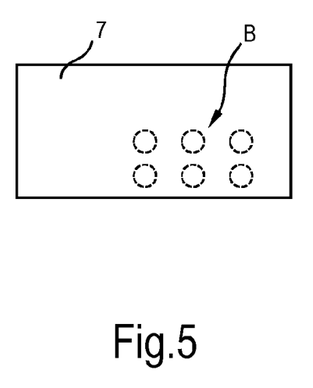
Figure 6:
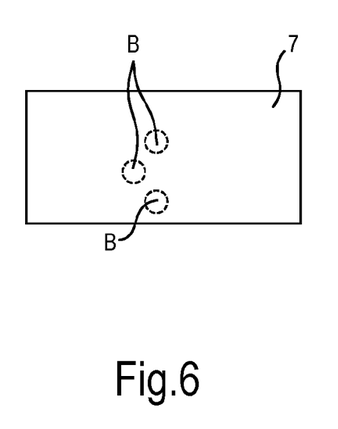
Figure 7:
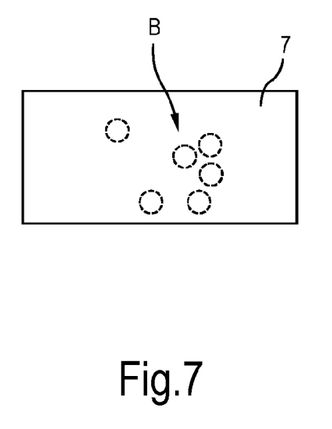

FIG. 4 to FIG. 7 show other possible arrangements of focal spots B on the phosphor surface 7. In this regard, FIG. 4 shows an arrangement analogous to FIG. 3, but now of three focal spots B. A specific region V may be illuminated by none of the light beams, by one light beam, by two light beams or by three light beams within an image set-up time. FIG. 5 shows six focal spots B, which can also be arranged in different lines. Moreover, as shown in FIG. 6, focal spots B may be arranged in different columns. As shown in FIG. 7, the focal spots or the arrangement of the pixels generated thereby are or is not restricted to a matrix pattern, but rather can be selected freely in principle. Moreover, not just point- or cycle-like focal spots need be generated, rather e.g. line-shaped focal spots can also be generated, e.g. by a partial superimposition of light beams.

By way of example, instead of one deflection mirrors 6, two deflection mirrors may be used, which both likewise have at least one vertical rotation axis D, wherein a light beam 4 or 5 is incident on only one of these two deflection mirrors. The spacing d may then be varied particularly simply by means of a relative change of a rotation angle of the two deflection mirrors with respect to one another.

Generally, "a(n)", "one", etc. can be understood to mean a singular or a plural, in particular in the sense of "at least one" or "one or a plurality", etc., as long as this is not explicitly excluded, e.g. by the expression "exactly one", etc.

Moreover, a numerical indication can encompass exactly the indicated number and also a customary tolerance range, as long as this is not explicitly excluded.

REFERENCE SIGNS

1 Lighting module
2 Laser
3 Laser
4 Light beam
5 Light beam
6 Deflection mirror
7 Phosphor surface
A1 Sequence
A2 Sequence
B1 Focal spot
B2 Focal spot
D Rotation axis
d Spacing
E On state
H Horizontal section
K Oblique section
O Off state
P Primary light
R Movement direction
S Secondary light
t1 First instant
t2 Later instant
t3 Even later instant
V Stationary region While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A lighting device, comprising:
a light generating unit configured to generate at least two light beams;
at least one phosphor surface which is illuminatable by the light beams; and
at least one movable deflection mirror for the scanning deflection of the light beams onto the phosphor surface, such that the light beams impinge on the at least one phosphor surface in a spaced-apart fashion and sweep over the phosphor surface in a line-like manner on a track having a plurality of lines, and
such that at least one region of the phosphor surface is illuminatable by the at least two light beams in a manner spaced apart temporally,
wherein an image refresh frequency is at least 100 Hz such that a temporal spacing of the at least two light beams during traversal of the track is no longer resolved observable temporally by a human observer.

2. The lighting device of claim 1,
wherein at least two light beams are configured to generate focal spots with a predetermined distance on the phosphor surface.

3. The lighting device of claim 2,
wherein the lighting device is designed to vary a distance between the focal spots on the phosphor surface.

4. The lighting device of claim 3,
wherein the lighting device is designed to vary a setting angle of at least one of the light beams relative to an associated deflection mirror.

5. The lighting device of claim 3,
wherein the lighting device is designed to direct at least two light beams onto respective movable deflection mirrors and is designed to vary an alignment of said deflection mirrors with respect to one another.

6. The lighting device of claim 1,
wherein the light beams are angled with respect to one another.

7. The lighting device of claim 1,
wherein at least one movable deflection mirror is embodied as a pivotable deflection mirror.

8. The lighting device of claim 1,
wherein the light beams can be switched on and off individually.

9. The lighting device of claim 1, further comprising:
a plurality of light sources configured to generate respective light beams.

10. The lighting device of claim 9,
a plurality of laser configured to generate respective light beams.

11. A method for generating a light emission pattern, the method comprising:
illuminating at least one phosphor surface by at least two light beams impinging on the phosphor surface in a spaced-apart fashion and sweeping over the phosphor surface in a line-like scanning manner on a track having a plurality of lines such that the at least one region of the phosphor surface is illuminated by at least two light beams in a manner spaced apart temporally,
wherein an image refresh frequency is at least 100 Hz such that a temporal spacing of the at least two light beams during traversal of the track is no longer resolved observable temporally by a human observer.

* * * * *